(12) United States Patent
Currey et al.

(10) Patent No.: US 10,760,716 B1
(45) Date of Patent: Sep. 1, 2020

(54) LEAK-PROOF CONNECTION FITTING

(71) Applicants: Mercury Plastics, LLC, Middlefield, OH (US); Delta Faucet Company, Taylor, MI (US)

(72) Inventors: Donald Currey, Chagrin Falls, OH (US); Scott R. Gardner, Chagrin Falls, OH (US); Brock Elsea, Cortland, OH (US); Earl Christian, Jr., Warren, OH (US)

(73) Assignee: Mercury Plastics LLC, Middlefield, OH (US)

( * ) Notice: Subject to any disclaimer, the term of this patent is extended or adjusted under 35 U.S.C. 154(b) by 936 days.

(21) Appl. No.: 15/071,937

(22) Filed: Mar. 16, 2016

Related U.S. Application Data

(60) Provisional application No. 62/134,305, filed on Mar. 17, 2015.

(51) Int. Cl.
| | | |
|---|---|---|
| *F16L 13/00* | (2006.01) | |
| *B29C 45/14* | (2006.01) | |
| *B29C 65/66* | (2006.01) | |
| *B29C 65/00* | (2006.01) | |
| *B29C 69/00* | (2006.01) | |

(52) U.S. Cl.
CPC .......... *F16L 13/004* (2013.01); *B29C 45/14* (2013.01); *B29C 65/66* (2013.01); *B29C 66/52* (2013.01); *B29C 69/00* (2013.01); *B29C 2045/1486* (2013.01)

(58) Field of Classification Search
CPC .......... F16L 13/004; F16L 37/02; F16L 37/04
See application file for complete search history.

(56) References Cited

U.S. PATENT DOCUMENTS

2016/0069489 A1 * 3/2016 de Gruyter ......... F16L 25/0018
137/798

FOREIGN PATENT DOCUMENTS

| DE | 102005015343 A1 | * | 10/2006 | ......... B29C 45/1676 |
|---|---|---|---|---|
| DE | 2007-258919 | * | 6/2008 | |
| DE | 102007050223 A1 | * | 6/2008 | ............. F16L 37/04 |
| EP | 1355099 A1 | * | 10/2003 | ............. F16L 37/04 |
| FR | 1588385 A | * | 4/1970 | ............. F16B 7/04 |
| JP | 2005155910 A | * | 6/2005 | ............. B60K 15/01 |

\* cited by examiner

*Primary Examiner* — David Bochna
*Assistant Examiner* — James A Linford
(74) *Attorney, Agent, or Firm* — Hahn Loeser & Parks LLP; Daniel J. Smola

(57) ABSTRACT

An apparatus and process by which a leak-proof connection with a polymeric tube is described herein. Particular embodiments of the present invention include a leak-proof connection fitting inserted into a bore of a overmolded attachment piece wherein the overmolded attachment piece is overmolded onto the polymeric tube. The leak-proof connection fitting includes multiple surfaces in various configurations. The multiple surfaces include barb(s), raised surface(s), reduced surface(s), and channel(s). O-rings may be further added to the leak-proof connection fitting. In some embodiments, the overmolded attachment piece or the tube itself is secured to the fitting by shape memory.

15 Claims, 13 Drawing Sheets

LEAK-PROOF CONNECTION FITTING

This application claims priority to, and the benefit of, U.S. Provisional Patent Application No. 62/134,305 filed on Mar. 17, 2015 with the United States Patent Office, which is hereby incorporated by reference.

BACKGROUND

Water system connections for appliance applications have a tube connected to a second part, where the second part may be a water source, a water dispensing apparatus, a filtering apparatus, another tube, or another part or assembly. Generally, the tube is connected to the second part by a connector which the tube is inserted into. An example of such a connection, using a connector, is referred to as a push-in style connection. In a push-in style connection, a tube is pushed into the connector and a seal is made by an O-ring positioned between the tube and the connector and kept in the connection by reverse angled teeth (i.e. a sharp edge).

Water system connections for appliances and, in particular, push-in style connections are prone to leaking for many reasons. By example, leaks occur when full engagement is not achieved between the connector and the tube, a seal is not made between the O-ring and the tube, and because side loads compromise the connection. Additionally, the end of a tube can cut or damage the o-ring surface during installation and cause a leak. In view of these deficiencies, a leak-proof connection fitting is needed for water system connections for appliance applications.

SUMMARY OF THE INVENTION

The invention described herein relates to a process and apparatus by which a leak-proof connection may be made at an appliance.

In one embodiment, a leak-proof connection replaces the factory installed connection with an apparatus having a barb and cuff design intended to be connected once. The assembly process of the apparatus can be easily monitored to ensure proper engagement and is designed to prevent the possibility of leaking.

In particular embodiments, the barb end of the connection may include a molded component which is attached to a plumbing component, including valves, filters, tees, overmolding on a tube, or other connector(s). The barb end of the connection may be molded from a number of plastic materials including polypropylene, polyethylene, PBT, etc. It could also be formed of a metallic material which may also include machined brass.

In particular embodiments, the barb end is designed with one or more sharp edges to provide retention to the cuff once it is installed and a smooth straight section which eliminate the effects of long term creep and therefore provides long-term sealing performance. The smooth straight section eliminates the effects of long term creep by providing additional surface area for retention and a seal in the instance the sharp edges of the barb deform or become rounded by the force exerted on them. Additionally, the additional surface area provides an increased sealing surface or more surface for maintaining a leak proof seal in instances where the tube may separate or be pulled away from the joint.

In some particular embodiments, the cuff end of the connection is overmolded onto a tube or molded as part of another fitting and may be made of cross-linked polyethylene (PEX). In other embodiments, the cuff end is the tube or a combination of the tube and the overmolding.

One particular embodiment of a tube connection assembly includes a leak-proof connection fitting inserted into a bore of an overmolded attachment piece formed on an extruded polymer tube. In some embodiments, the fitting is inserted into the bore of the extruded polymer tube. The leak-proof connection fitting comprises a first end and a second end, the second end positioned opposite the first end. The fitting may include a barb having a barb outside diameter such that the barb is proximal the first end. A sharp edge may be formed on the barb, at the barb outside diameter, for forming a retention surface. The fitting may also include a raised surface wherein the raised surface is distal the first end. The raised surface has a raised surface outside diameter and a smooth straight section. The smooth straight section having the raised surface outside diameter the length of the section. A reduced surface having a reduced surface outside diameter may separate the barb from the raised surface. The reduced surface outside diameter is less than the raised surface outside diameter. In various embodiments, the raised surface outside diameter may be greater than or equal to the barb outside diameter. In some embodiments, the leak-proof connection fitting of the tube connection assembly may include an assembly retraction flange wherein the raised surface is proximal the assembly retraction flange. An O-ring may additionally be added to the leak-proof connection fitting and/or be seated into a channel formed on the leak-proof connection fitting.

Another embodiment of a tube connection assembly may include a leak-proof connection fitting comprising multiple raised surfaces. In this particular embodiment, the leak-proof connection fitting having a first end and a second end may additionally include a barb, as previously described. The leak-proof connection fitting may include a first raised surface having a first raised surface outside diameter and a first smooth straight section. The first raised surface being distal the first end. The leak-proof connection fitting may further include a second raised surface. The second raised surface has a second raised surface outside diameter and a second smooth straight section. The second raised surface also being distal the first end. A first reduced surface, having a first reduced surface outside diameter, separates the barb from the first raise surface. The first reduced surface outside diameter is less than the first raised surface outside diameter. A second reduced surface having a second reduced surface outside diameter may separate the first raised surface and the second raised surface. In this instance, the second reduced surface outside diameter is less than the first raised surface outside diameter and the second raised surface outside diameter.

In particular embodiments, the process for assembly of the apparatus includes expanding the cuff using a pin or mandrel and pushing the expanded cuff over the barb. In some embodiments, the assembly of the cuff onto the barb could be performed manually using this process and require very little force. In another embodiment, mechanical force may be used to push the unexpanded cuff over the barb. A sensor may be used to detect and ensure full and proper engagement between the cuff and the barb.

In one particular embodiment of a process for securing a leak-proof connection fitting to an extruded polymeric tube a polymer overmolded attachment piece having a bore is overmolded onto a tube at or adjacent one end of said tube. The tube and the polymer overmolded attachment pieces are crosslinked after being overmolded. A first end of a fitting, including the fittings described in the embodiments above, is inserted into the bore. The overmolded attachment piece is secured to the fitting by shape memory property of a crosslinked component.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
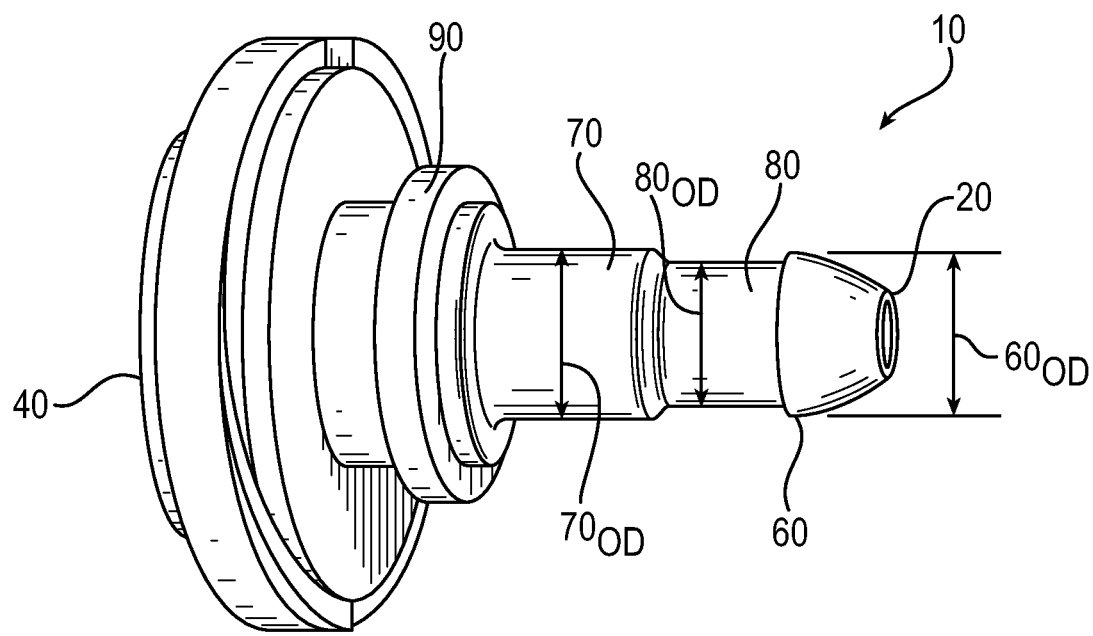
FIG. 1 is a perspective view of a fitting, in accordance with an embodiment of the invention.

Embodiments of the present invention include apparatus and processes by which a leak-proof connection with a polymeric tube is achieved. Specifically, the present invention includes various combinations of fittings, tubes and overmolded attachment pieces for making water system connections at appliances.

In particular embodiments of the present invention, the process for securing a fitting to an extruded polymeric tube includes overmolding a polymer overmolded attachment piece onto a tube. The overmolded attachment piece may be overmolded onto the tube at or adjacent one end of said tube. The overmolded attachment piece has a bore into which the tube and/or a fitting may be inserted. The portion of the tube or the overmolded attachment piece, having the bore into which the fitting is inserted, is referred to as a cuff.

In some embodiments of the present invention, to secure the fitting to the tube or an overmolded attachment piece, a first end of the fitting is inserted into the bore. The fitting includes a first end and a second end, the second end positioned opposite the first end. Embodiments of the present invention include fittings having various combinations of one or more barbs, one or more raised surfaces, one or more reduced surfaces, one or more O-rings, one or more pliable surfaces, one or more contours, one or more ribs, and the like between the first end and the second end. In one particular embodiment, the fitting includes a barb proximal the first end of the fitting. The barb has a barb outside diameter. The barb is designed with one or more sharp edges to provide retention to the cuff once it is installed. Distal the first end of the fitting is a first raised surface. The first raised surface includes a first raised surface outside diameter. The first raised surface forms a smooth straight section. The smooth straight section eliminates the effects of long term creep by providing additional surface area for retention and a seal for when the sharp edges of the barb deform or become rounded by the force exerted at the connection. Additionally, the additional surface area provides an increased sealing surface or more surface for maintaining a leak proof seal in instances where the tube may separate or be pulled away from the joint. A second raised surface may also be provided, distal the first end. The second raised surface includes a second raised surface outside diameter. Similar to the first raised surface, the second raised surface may form a smooth straight section. Separating the barb from the first raised surface along a longitudinal length of the fitting may be a first reduced surface. The first reduces surface has a first reduced surface outside diameter wherein the first reduced surface outside diameter is less than the first raised surface outside diameter. Separating the first raised surface from the second raised surface along a longitudinal length of the fitting may be a second reduced surface. The second reduced surface has a second reduced surface outside diameter wherein the second reduced surface outside diameter is less than the first raised surface outside diameter and the second raised surface outside diameter.

In various embodiments of the present invention, the cuff is secured to the fitting by shape memory. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoset (covalently crosslinked) polymeric materials. Shape memory and shape memory materials are discussed in greater detail, below.

In particular embodiments, the process for assembly of the apparatus includes expanding the cuff using a pin or mandrel and pushing the expanded cuff over the barb. The assembly of the cuff onto the barb could be performed manually using this process and may require very little force. In another embodiment, mechanical force may be used to push the unexpanded cuff over the barb. A sensor may be used to detect and ensure full and proper engagement between the cuff and the barb.

Referring now to the drawings wherein the figures are for purpose of illustrating the various embodiments of the invention and not for purposes of limiting the same, the Figures show a leak-proof connection fitting.

Figure 2:
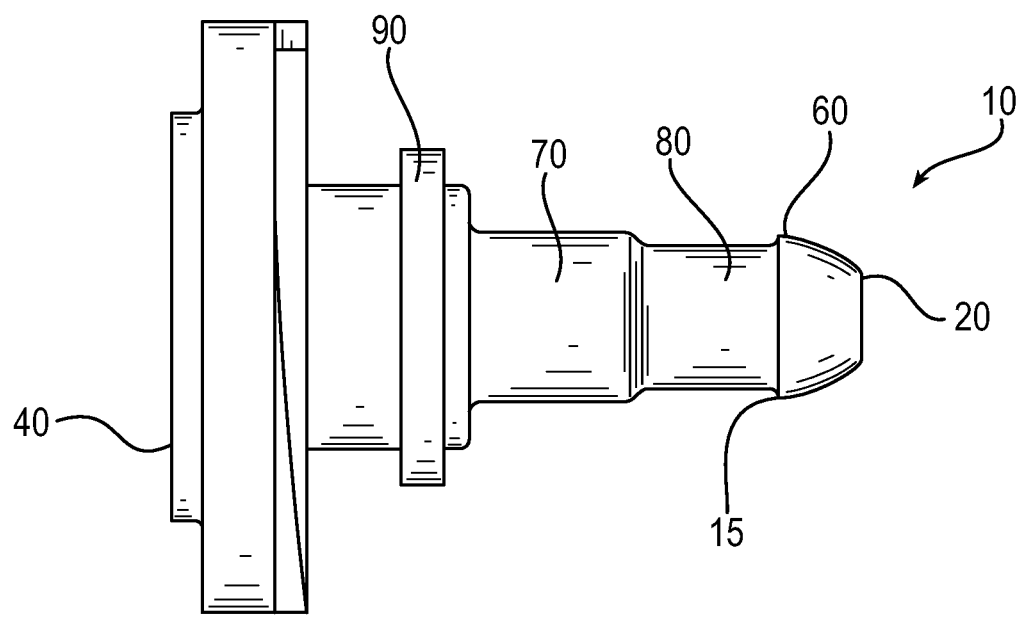
FIG. 2 is a side view of the fitting of FIG. 1, in accordance with an embodiment of the invention.
Figure 5:
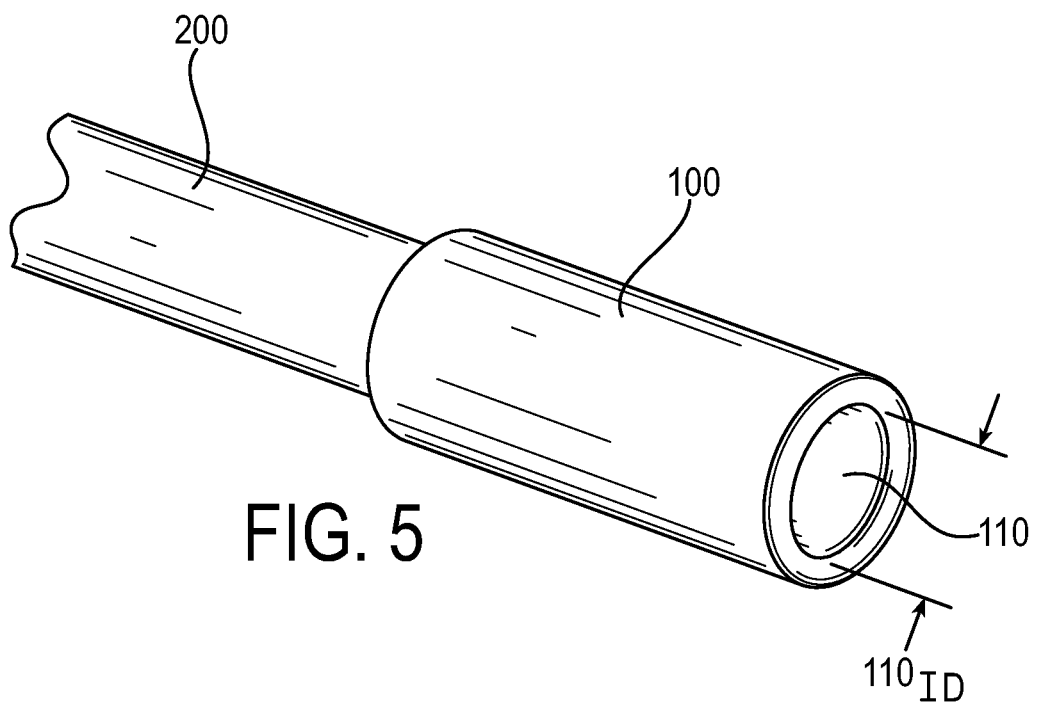
FIG. 5 is a perspective view of an extruded polymeric tube with an overmolded attachment piece, in accordance with an embodiment of the invention.
Figure 6:
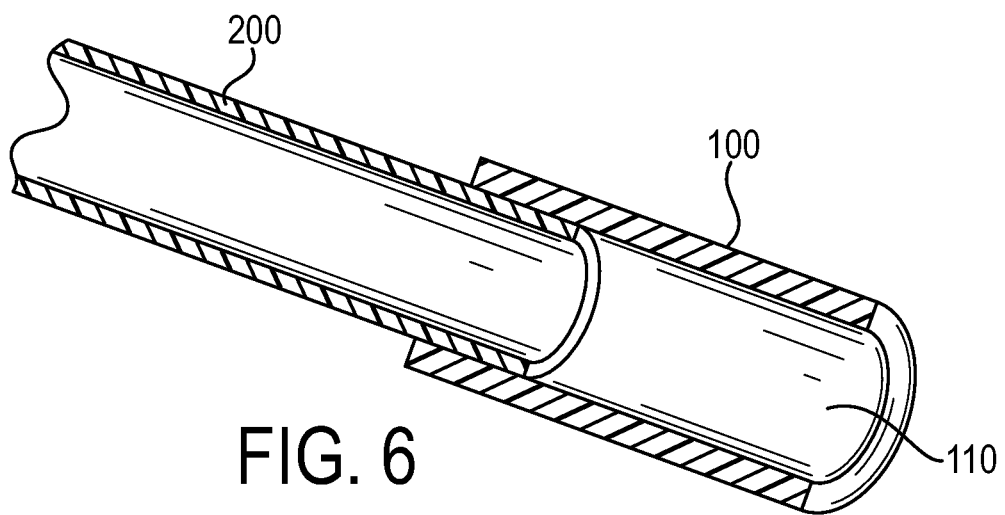
FIG. 6 is a side cross sectional view of an extruded polymeric tube with an overmolded attachment piece, in accordance with an embodiment of the invention.
Figure 23:
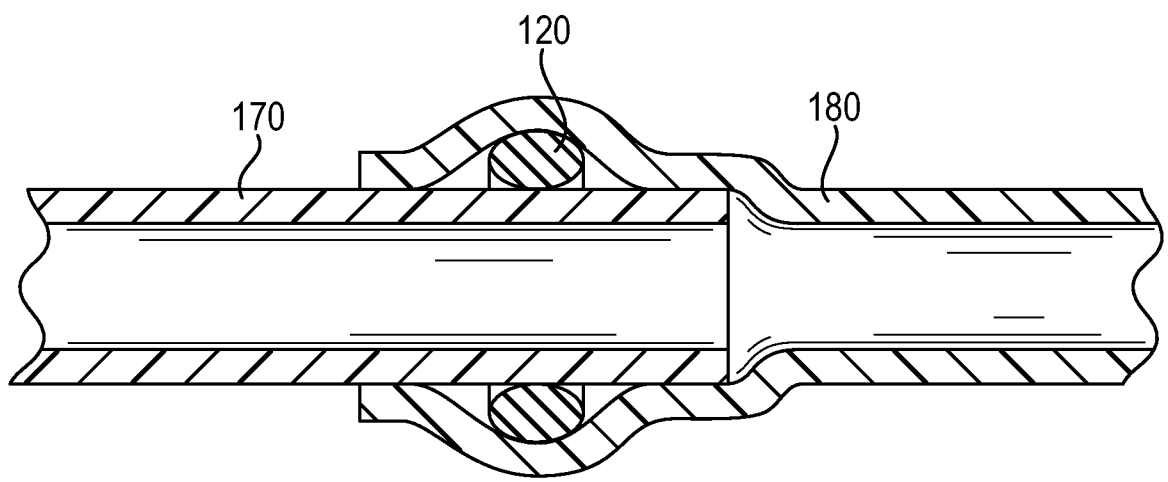
FIG. 23 is a side cross sectional view of a female tube expanded over a male tube, in accordance with an embodiment of the invention.
Figure 24:
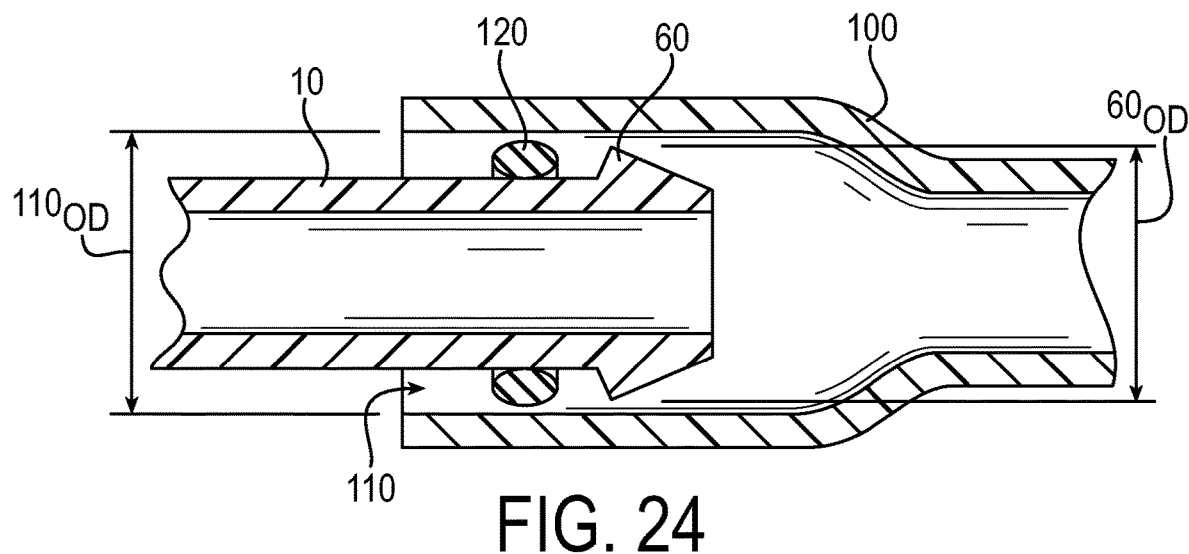
FIG. 24 is a side cross sectional view of a tube expanded about a fitting for subsequent shape memory at the fitting, in accordance with an embodiment of the invention.
Figure 25:
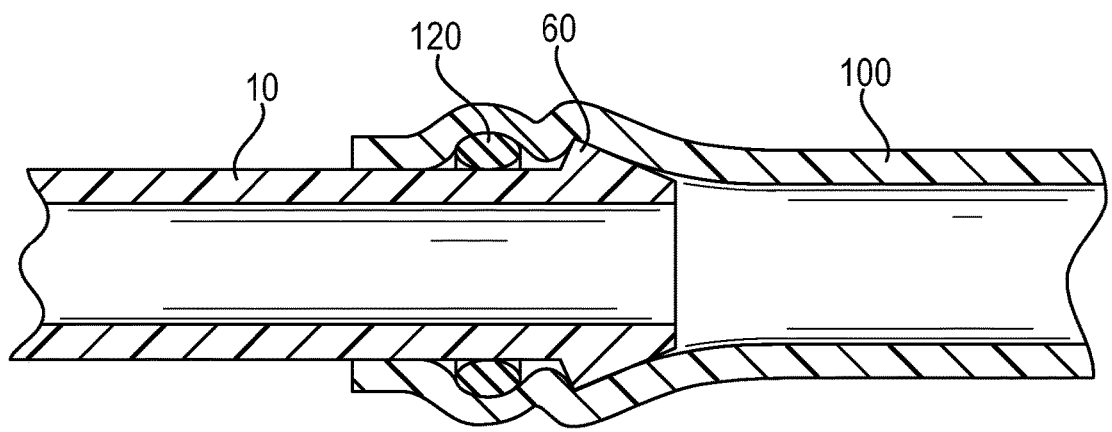
FIG. 25 is a side cross sectional view of the tube positioned about the fitting of FIG. 24 with shape memory applied to the tube, in accordance with an embodiment of the invention.

FIGS. 1-2 illustrate a fitting 10 used in one particular embodiment of the present invention. The fitting 10 is configured to be inserted into a cuff end. A cuff end may include a cavity of a bore 110 of an overmolded attachment piece 100, as illustrated by FIGS. 7-8, and 12-20, or the bore of a tube, as illustrated by FIGS. 23-25. The bore 110 of the overmolded attachment piece 100 forms the cavity for connecting the fitting to a tube 200. The tube 200 and/or the overmolded attachment piece 100 may be formed of any material known in the art including polypropylene, polyethylene, PBT, etc. By example, the tube 200 is referred to, herein, as an extruded polymer tube 200. The overmolded attachment piece 100 may be formed on the extruded polymer tube 200 or, alternatively, mechanically attached to the extruded polymer tube 200. In other embodiments, the overmolded attachment piece may be attached to any plumbing component, examples of which include a valve, a filter, a tee, or other connections. An example of the overmolded attachment piece 100 formed on an extruded polymer tube 200 is illustrated in FIGS. 5-6.

In the particular embodiment of FIGS. 1-2, the fitting 10 includes a first end 20 and a second end 40. The second end 40 is positioned opposite the first end 20. Proximal the first end 20 is a barb 60. The barb 60 has a barb outside diameter $60_{OD}$. Distal the first end 20 is a raised surface 70. The raised surface 70 has a raised surface outside diameter $70_{OD}$. A reduced surface 80 separates the barb 60 from the raised surface 70 on the fitting 10. The reduced surface 80 has a reduced surface outside diameter $80_{OD}$. The reduced surface outside diameter $80_{OD}$ is less than the raised surface outside diameter $70_{OD}$. Additionally or alternatively, the reduced surface outside diameter $80_{OD}$ is less than the barb outside diameter $60_{OD}$. As further illustrated by the particular embodiments of FIGS. 1-2, the raised surface outside diameter $70_{OD}$ may be equal to the barb outside diameter $60_{OD}$. Alternatively, the raised surface outside diameter $70_{OD}$ may be less than or greater than the barb outside diameter $60_{OD}$. Moreover, more than one barb 60 may be positioned or formed on the fitting 10.

In one particular embodiment, as illustrated by FIGS. 1-2, particular features may be incorporated at the fitting 10 and, in particular, at the barb 60 and/or raised surface 70 in order to increase long term sealing performance and eliminates the effects of movement, including long term creep. By example, the raised surface outside diameter $70_{OD}$ may be a constant dimension. The raised surface 70 having a constant dimension forms a smooth straight raised section on the fitting thereby providing increased surface area on the fitting 10 for the overmolded attachment piece 100 to contact and engage.

Referring to the particular embodiment of FIG. 2, a sharp edge 15 is formed on the barb 60 at the barb outside diameter $60_{OD}$. The sharp edge 15 provides retention of the overmolded attachment piece 100 to the fitting 10. Alternatively or additionally, one or more sharp edges 15 may be formed on the raised surface 70 at the transition between the raised surface 70 and the reduced surface 80 for cuff retention.

Still referring to FIGS. 1-2, the second end 40 of the fitting 10 includes an assembly retraction flange 90. However, it is appreciated the assembly retraction flange 90 may be positioned anywhere along the fitting 10. In some embodiments a retraction flange may not be provided. The assembly retraction flange 90 may be used to mechanically or physically force the fitting 10 into the overmolded attachment piece 100. Alternatively, the assembly retraction flange 90 may be used to mechanically or physically monitor or measure the connection between the fitting 10 and the overmolded attachment piece 100 to ensure proper engagement and, thereby, prevent the possibility of a leak. The connection may be monitored or measured by applying a force (i.e. attempting to separate the fitting 10 from the overmolded attachment piece 100) to the assembly retraction flange 90 to determine that fitting 10 is adequately secured to the overmolded attachment piece 100. A sensor may be additionally or alternatively be used to measure or monitor the connection between the fitting 10 and overmolded attachment piece 100.

Figure 3:
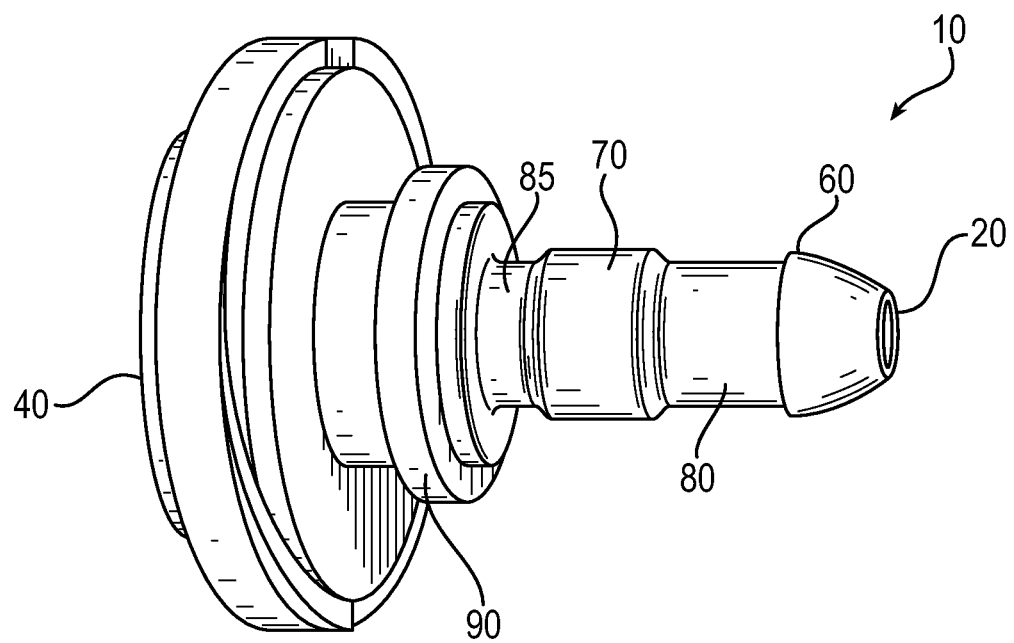
FIG. 3 is a perspective view of a fitting, in accordance with yet another embodiment of the invention.
Figure 4:
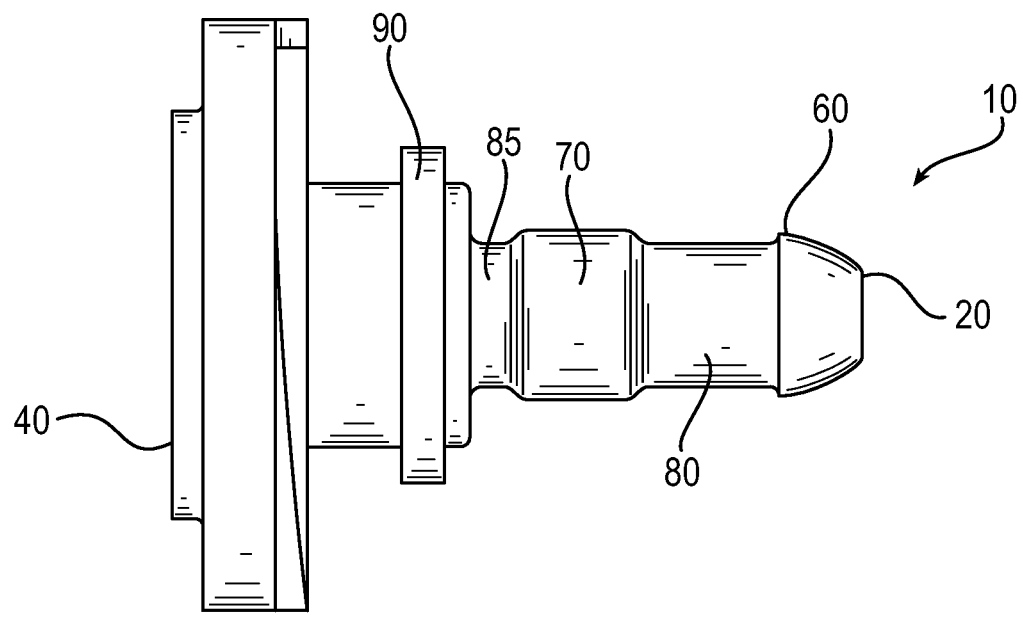
FIG. 4 is a side view of the fitting of FIG. 3, in accordance with yet another embodiment of the invention.
Figure 10:
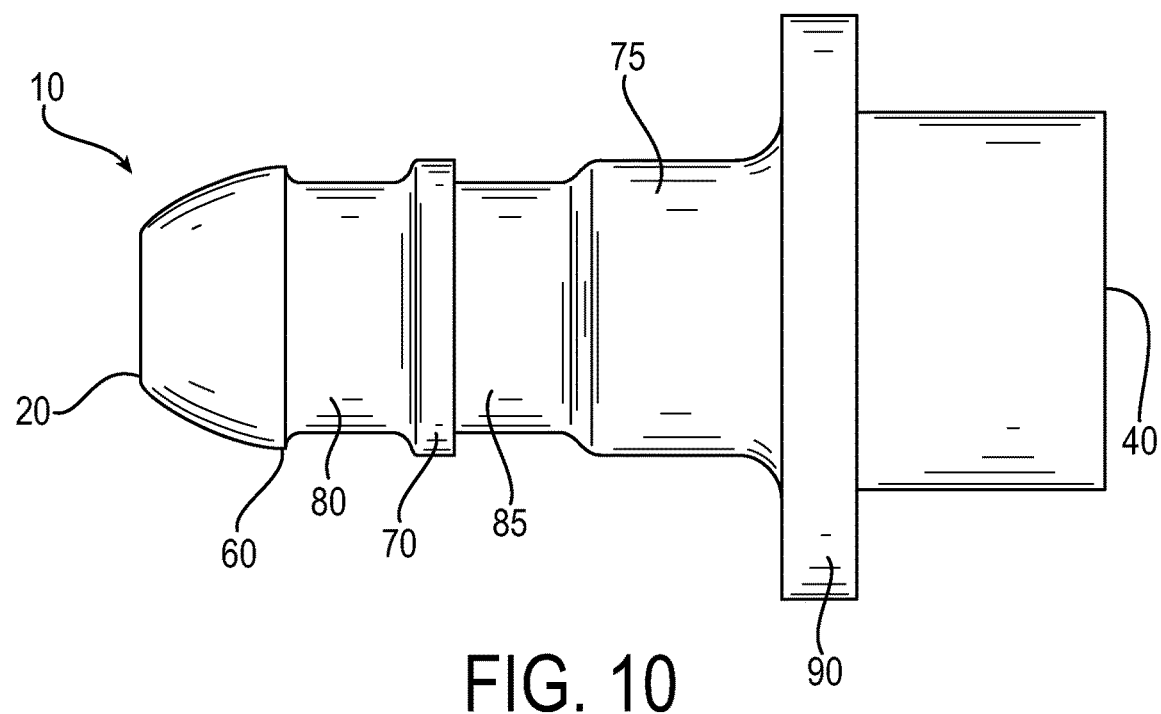
FIG. 10 is a side view of a fitting, in accordance with yet another embodiment of the invention.

As illustrated by FIGS. 1-2, the assembly retraction flange 90 is proximal to the raised surface 70, or vice versa. Alternatively, as illustrated by FIGS. 3-4, the assembly retraction flange 90 is separated on the fitting 10 from the raised surface 70 by a second reduced surface 85. Regardless of whether the fitting includes the assembly retraction flange 90, multiple reduced surfaces (i.e. first reduced surface, second reduced surface, third reduced surface, etc.) may separate multiple raised surfaces (i.e. first raised surface, second raised surface, third raised surface, etc.) on the fitting 10. By example, a first raised surface having a first raised surface outside diameter may be positioned distal the first end and a second raised surface having a second raised surface outside diameter may be positioned distal the first end independent of the first raised surface. The first raised surface may be separated from the barb by a first reduced surface having a first reduced surface outside diameter. The first reduced surface outside diameter may be less than the first raised surface outside diameter. Additionally, the second raised surface may be separated from the first raised surface by a second reduced surface having a second reduced surface outside diameter. The second reduced surface outside diameter being less than the first and/or second raised surface outside diameter. FIG. 10 illustrates a fitting having a first raise surface 70 and also a second raised surface 75.

FIGS. 5-6 illustrate a tube 200 having an overmolded attachment piece 100. FIG. 5 provides a perspective view of the tube 200 and the overmolded attachment piece 100. FIG. 6 provides a cross-sectional view of the tube 200 and the overmolded attachment piece 100. In this particular embodiment, the tube 200 extends into the bore 110 of the overmolded attachment piece wherein the bore 110 has a bore inside diameter $110_{ID}$. As further discussed below, a fitting may be inserted into the bore 110 of the overmolded attachment piece, opposite the tube 200.

Figure 7:
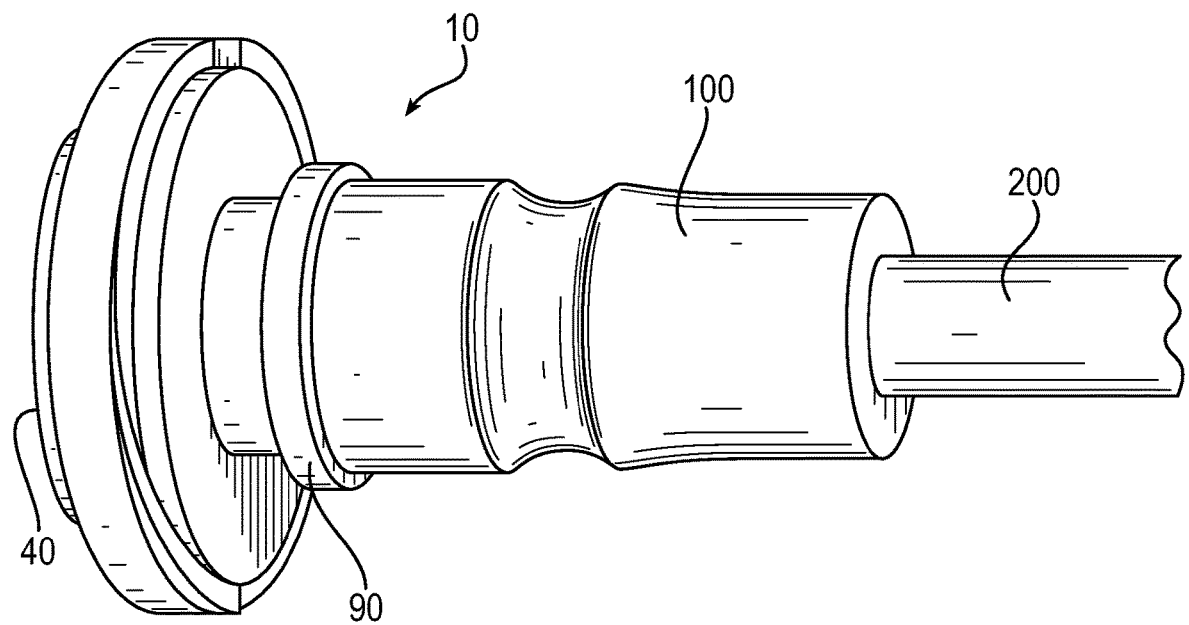
FIG. 7 is a perspective view of a fitting inserted into an overmolded attachment piece of an extruded polymeric tube, in accordance with an embodiment of the invention.
Figure 8:
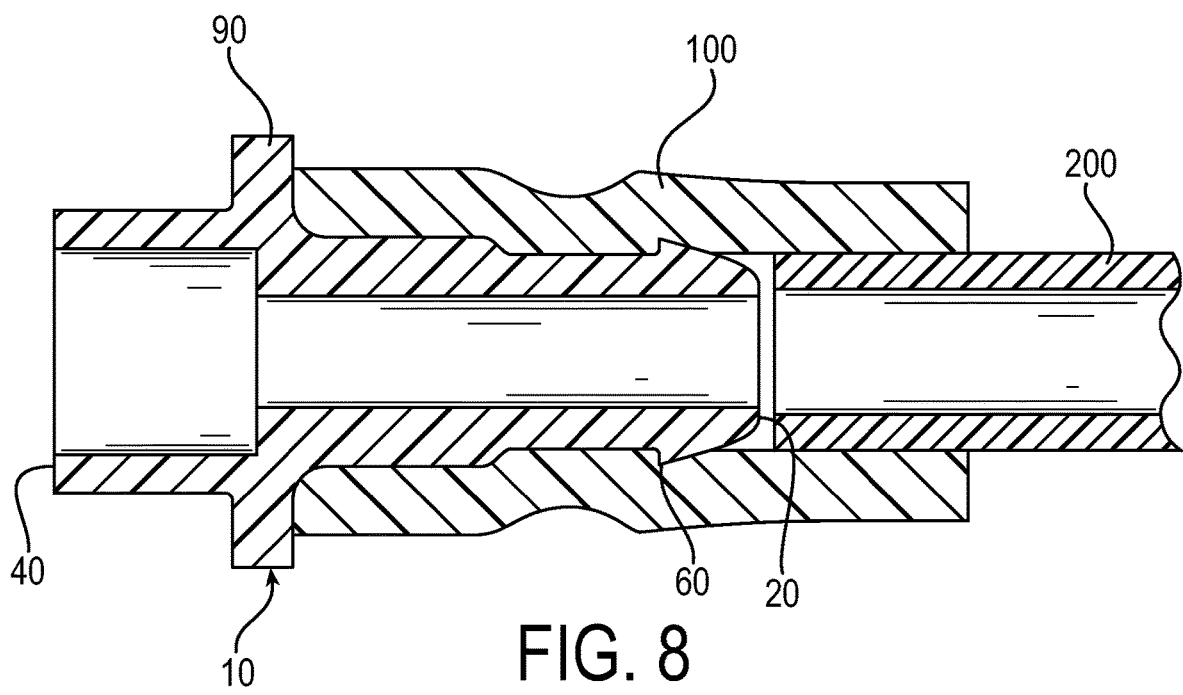
FIG. 8 is a side cross sectional view of a fitting inserted into an overmolded attachment piece of an extruded polymeric tube, in accordance with an embodiment of the invention.
Figure 9:
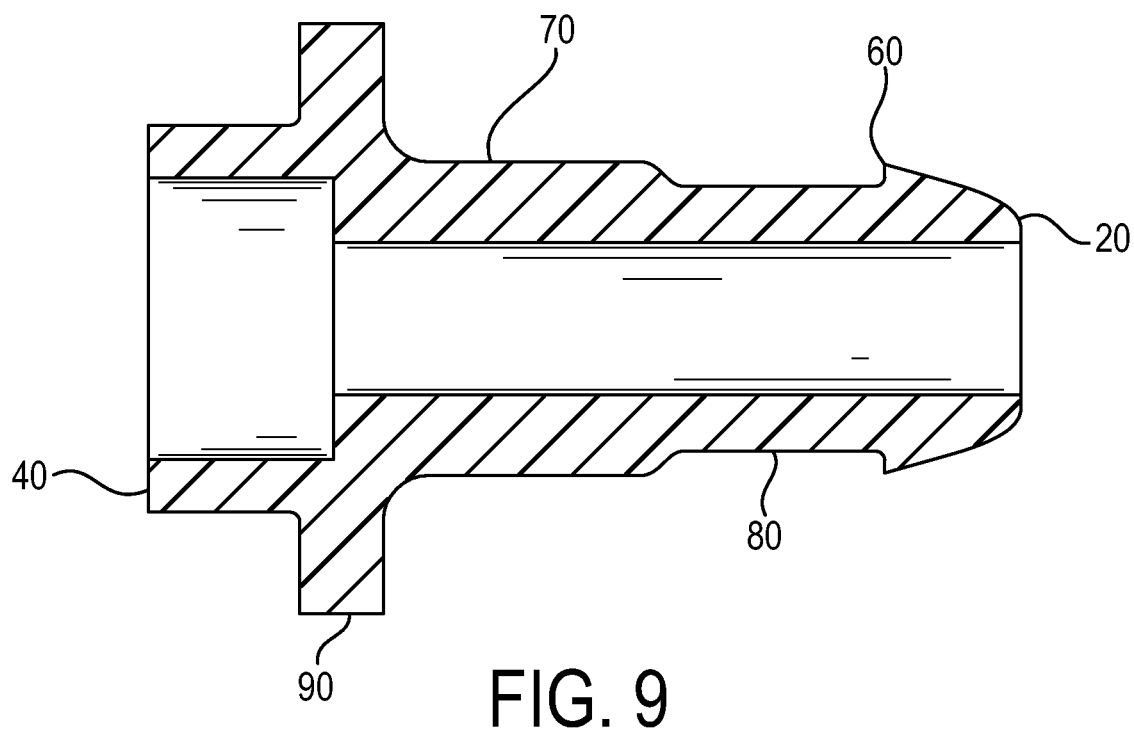
FIG. 9 is a side cross sectional view of a fitting, in accordance with an embodiment of the invention.

Referring to FIGS. 7-9, to create the leak-proof connection between the fitting 10 and the overmolded attachment piece 100, a bore inside diameter $110_{ID}$ (as labeled in FIG. 5) of the bore 110 of the overmolded attachment piece 100 is less than the raised surface outside diameter $70_{OD}$. To insert the fitting 10 into the bore 110, the bore inside diameter $110_{ID}$ is expanded using a pin or mandrel. Once expanded, the overmolded attachment piece 100 is pushed over the barb 60 of the fitting 10, thereby inserting the fitting 10 into the bore 110. This assembly may be performed manually. Alternatively, the fitting 10 may be inserted into the bore 110 using mechanical force. A mandrel or pin, for expanding the bore inside diameter $110_{ID}$, may or may not be used before mechanically inserting the fitting 10 into the bore 110. It is understood, variations of these processes for attachment may be used. By example, with enough force, the fitting 10 may be inserted into the bore 110 manually without first expanding the overmolded attachment piece using a pin or mandrel.

Referring now to FIG. 8, upon inserting the fitting 10 into the bore 110 a leak-proof connection is formed between the fitting 10 and the overmolded attachment piece 100. In this particular embodiment, the bore inside diameter $110_{ID}$ forms around the fitting such that the bore inside diameter $110_{ID}$ contacts and/or is substantially maintained at the reduced surface 80 of the fitting 10. This may be accomplished by making the bore inside diameter $110_{ID}$ equal to or less than the reduced surface outside diameter $80_{OD}$. The connection between the overmolded attachment piece 100 may be further secured by applying the properties of an overmold or applying shape memory, thereby requiring no clamping.

Figure 11:
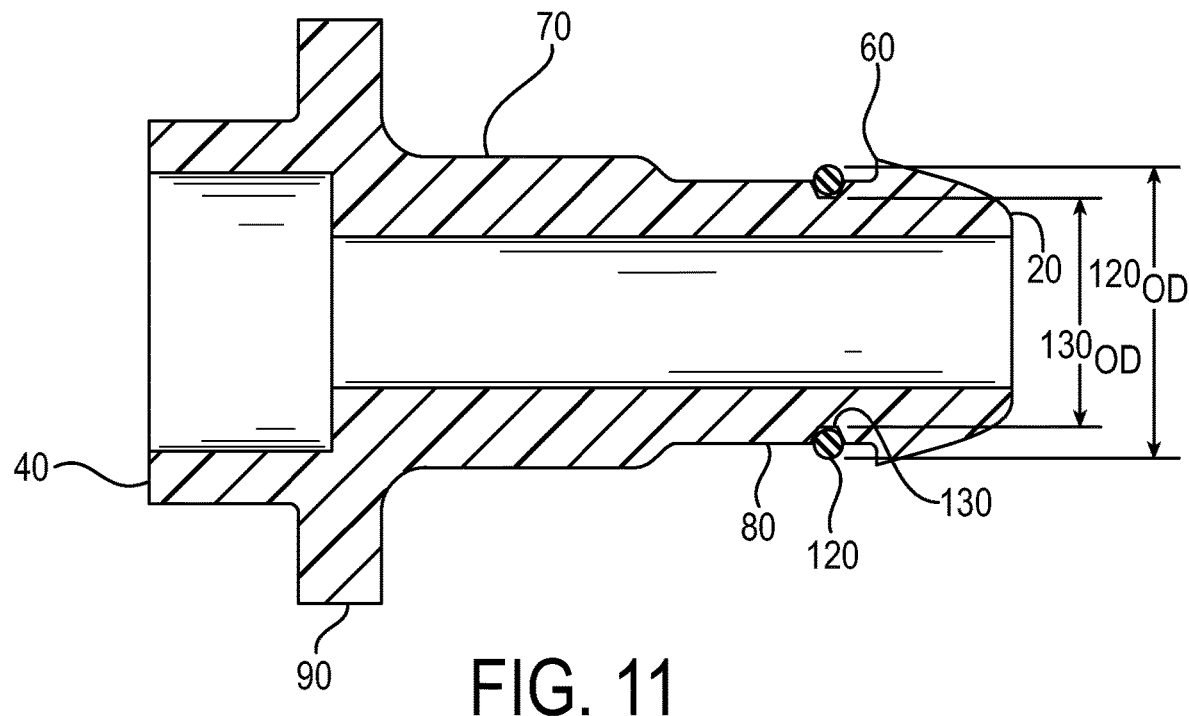
FIG. 11 is a side cross sectional view of a fitting, in accordance with an embodiment of the invention.

In yet another embodiment and as illustrated by FIG. 11, an O-ring 120 is positioned on the fitting to provide an additional seal. Upon inserting the fitting 10 into the bore 110 of an overmolded attachment piece 100 the O-ring is positioned between the fitting and the overmolded attachment piece. In one particular embodiment, the O-ring 120 is positioned on the fitting 10 about the reduced surface 80 separating the barb 60 and the raised surface 70. The O-ring 120 may be further seated in a channel 130 on the reduced surface 80. The channel outside diameter $130_{OD}$ is less than the reduced surface outside diameter $80_{OD}$. The channel may additionally or alternatively be formed by a reduced surface forming a V-shape, with the reduced diameter positioned to the base of the V, between the raised surface 70 and the barb 60. The O-ring 120 may be positioned in the reduced surface and/or the channel such that the O-ring's 120 position is maintained while the fitting 10 is inserted in the overmolded attachment piece 100. In one embodiment, to accomplish this the O-ring 120 may have an O-ring outside diameter $120_{OD}$ less than the barb outside diameter $80_{OD}$. Therefore, the O-ring 120 does not come into communication with the overmolded attachment piece 100 as the overmolded attachment piece is being forced over the barb 60 of the fitting 10. By forcing the overmolded attachment piece over the barb of the fitting, the overmolded attachment piece is expanded. This expansion provides the clearance necessary to avoid or not come into contact with the O-ring positioned adjacent the barb. With this clearance, the overmolded attachment piece does not contact the O-ring and the O-ring does not roll or become pushed out of position by the overmolded attachment piece. Upon positioning the overmolded attachment piece over the fitting, shrink back or shape memory, as discussed in greater detail below, brings the O-ring into communication with the overmolded attachment piece, between the overmolded attachment piece and the fitting. Shrink back additionally reduces the effect of side load by forcing the overmolded attachment piece to take the shape of the barb or other features of the fitting. Furthermore, the speed at which the fitting 10 is inserted into the bore and the distance between the barb and the O-ring 120 may be adjusted to prevent the overmolded attachment piece 100 from damaging or moving the O-ring 120 during installation. Additionally and alternatively, an O-ring 120, as described above, may be positioned in a reduced surface between two raised surfaces and/or a raised surface and the assembly retraction flange 90.

FIGS. 12 thru 25 illustrate various embodiments of a leak proof connection fitting in combination with an overmolded attachment piece and/or tube. These various embodiments include features used independently or in combination with one another in order to accomplish a leak-proof connection. These features include ridges at the overmolded attachment piece, o-rings seated in an overmolded attachment piece, reduced back ramp along an overmolded attachment piece (for securing an o-ring), multiple o-rings, multiple surfaces which may include barb(s), a pliable sleeve used in addition to or alternatively to an o-ring, PEX connection and/or any combination of the above. Particular embodiments illustrating these features and a combination of these features will be discussed in greater detail below with reference to each Figure. As further illustrated by FIGS. 12-18, the fitting may be overmolded onto a tube. This may be in addition to or as an alternative to the assembly retraction flange as illustrated in FIG. 8.

Figure 12:
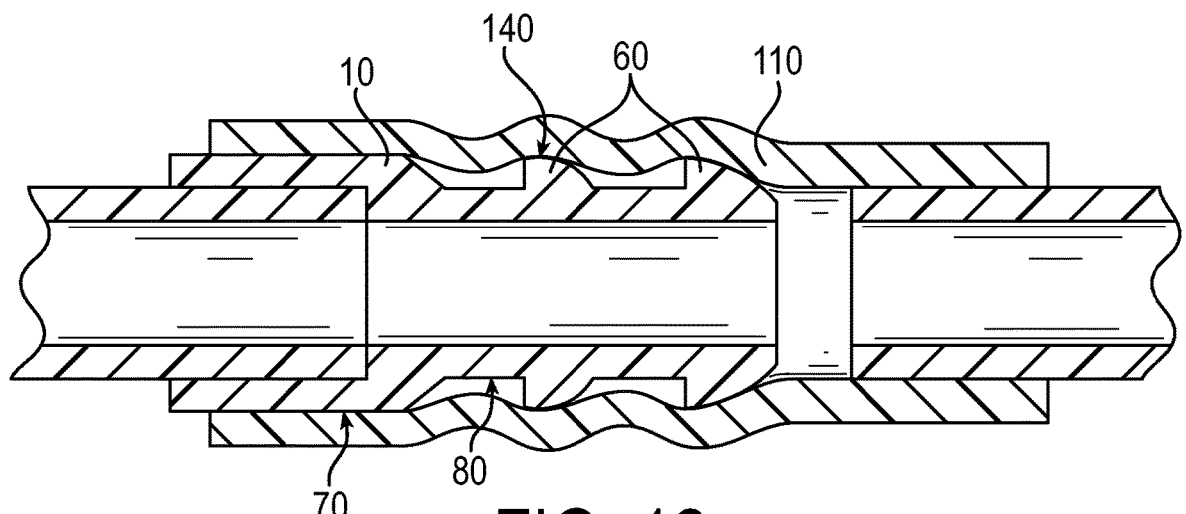
FIG. 12 is a side cross sectional view of a fitting and a ribbed overmolded attachment piece, in accordance with an embodiment of the invention.

Referring to FIG. 12, an overmolded attachment piece 100 is ribbed. One or more ribs 140 of the overmolded attachment piece are engaged with one or more barbs 60. FIG. 12 illustrates two barbs over which the ribs 140 pass. Between each rib 140 and the corresponding barb 60, the overmolded attachment piece 100 extends into a reduced surface 80. FIG. 12 also illustrates a raised surface 70, over which the overmolded attachment piece 100 extends and engages. By increasing surface area when the raised surface 70 engages the overmolded attachment piece 100, the effects of long term creep are eliminated.

Figure 13:
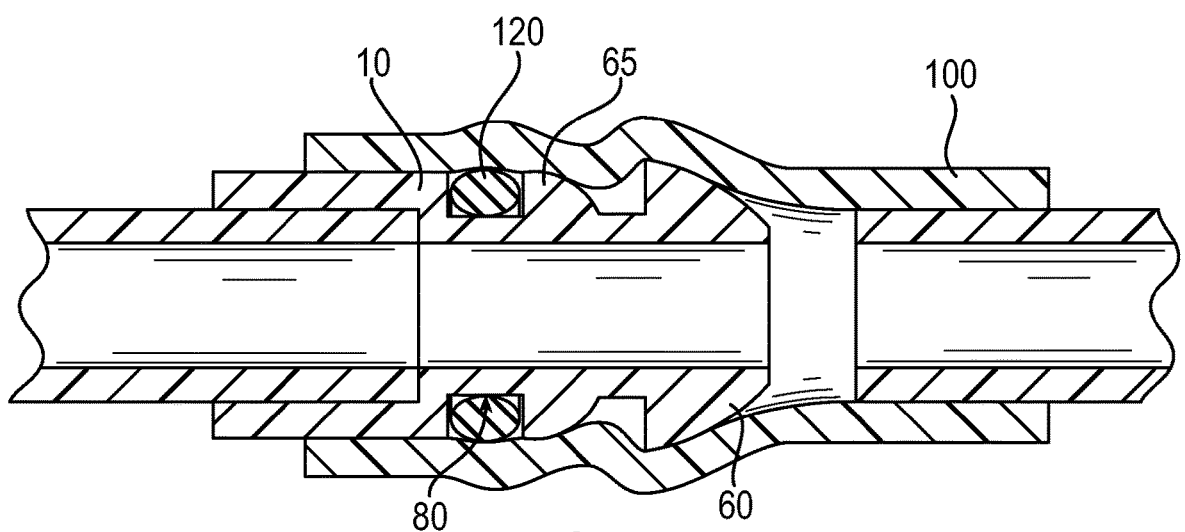
FIG. 13 is a side cross sectional view of a fitting having a first barb and a second barb in combination with an overmolded attachment piece having an O-ring there between, in accordance with an embodiment of the invention.

Referring now to FIG. 13, an overmolded attachment piece 100 extends over a fitting 10 having a first barb 60. Specifically, the first barb has an outside diameter greater than the raised surface outside diameter and an outside diameter of a second barb 65. Positioned in a reduced surface 80 is an O-ring 120. When inserting the fitting 10 into the bore of an overmolded attachment piece 100, the first barb 60 stretches the overmolded attachment piece 100 allowing the overmolded attachment piece 100 to pass or extend over the second barb 65 and the O-ring 120. This limits or eliminates any disruption to the position of the O-ring when the fitting 10 is inserted into the overmolded attachment piece 100 or the overmolded attachment piece 100 passes over the fitting 10.

Figure 14:
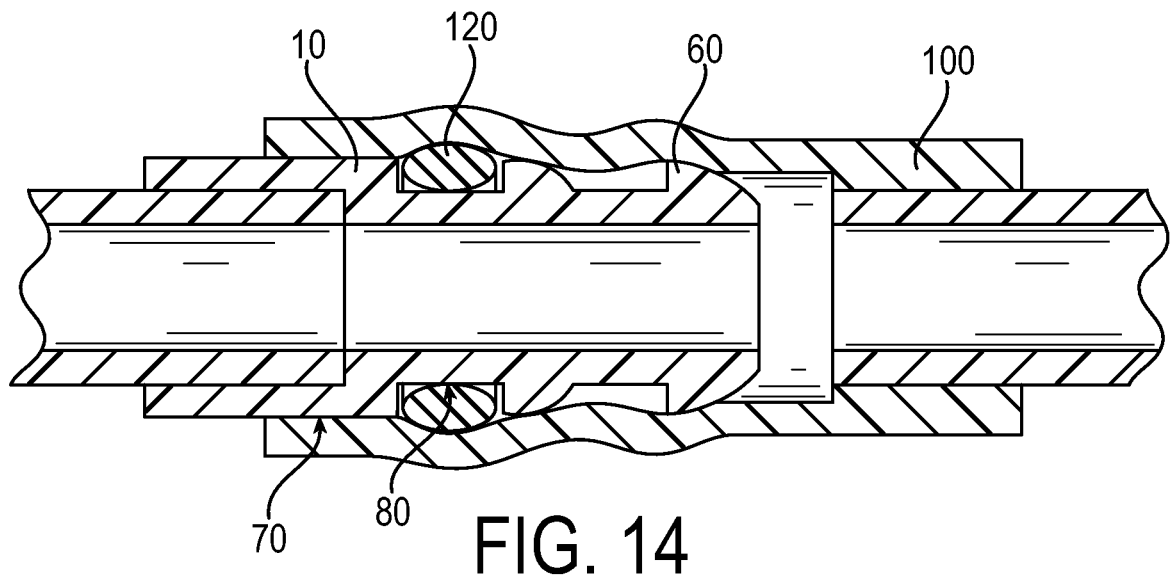
FIG. 14 is a side cross sectional view of a fitting having a first barb and a second barb and an overmolded attachment piece having an O-ring there between, in accordance with an embodiment of the invention.

Turning to FIG. 14, an overmolded attachment piece 100 extends over a fitting 10 having a barb 60 with a barb outside diameter equal to or smaller than the raised surface outside diameter. An O-ring 120 is positioned at a reduced surface 80. The raised surface 70 engages the overmolded attachment piece 100 to form a sealing surface and provide a solution to the effects of long term creep.

Figure 15:
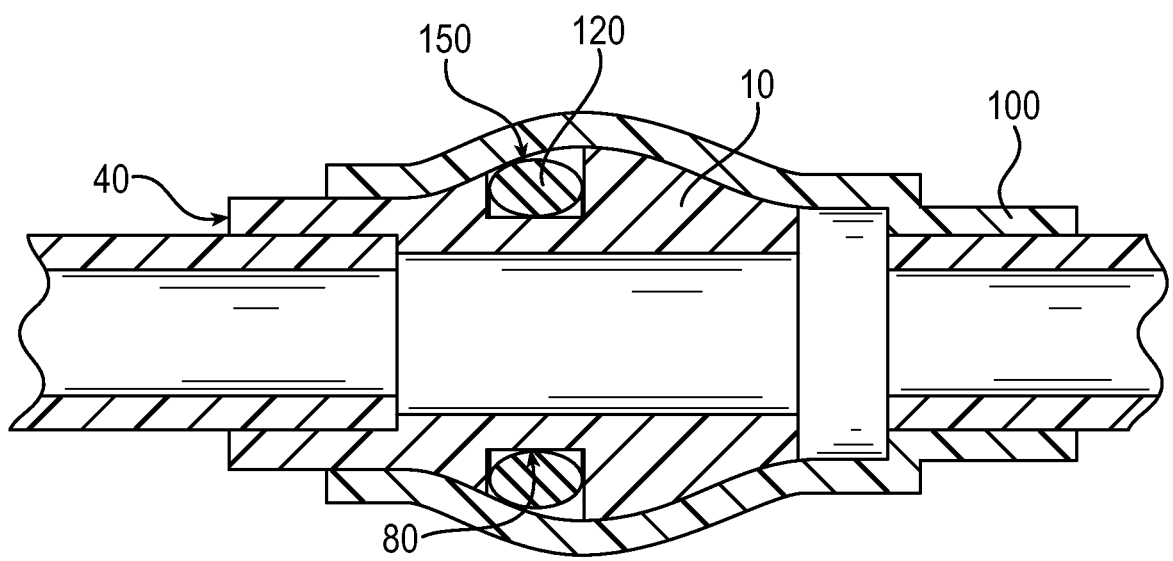
FIG. 15 is a side cross sectional view of a fitting having a raised surface with a convex profile and an overmolded attachment piece, in accordance with an embodiment of the invention.

FIG. 15 illustrates a fitting with a reduced back ramp 150 and an O-ring 120 positioned therein. Specifically, the fitting 10 includes a raised surface with a convex profile at the exterior perimeter of the fitting. The overmolded attachment piece 100 extends over the convex profile of the fitting 10. Within the convex profile is reduced surface 80. The reduced surface 80 is positioned on the convex profile toward the second end 40 of the fitting 10, or on a reduced back ramp 150, with an O-ring 120 located therein. When extending the overmolded attachment piece 100 over the fitting 10, The overmolded attachment piece 100 is expanded outwardly by the convex profile and easily passes over the O-ring 120 located at the reduced back ramp 150.

Figure 16:
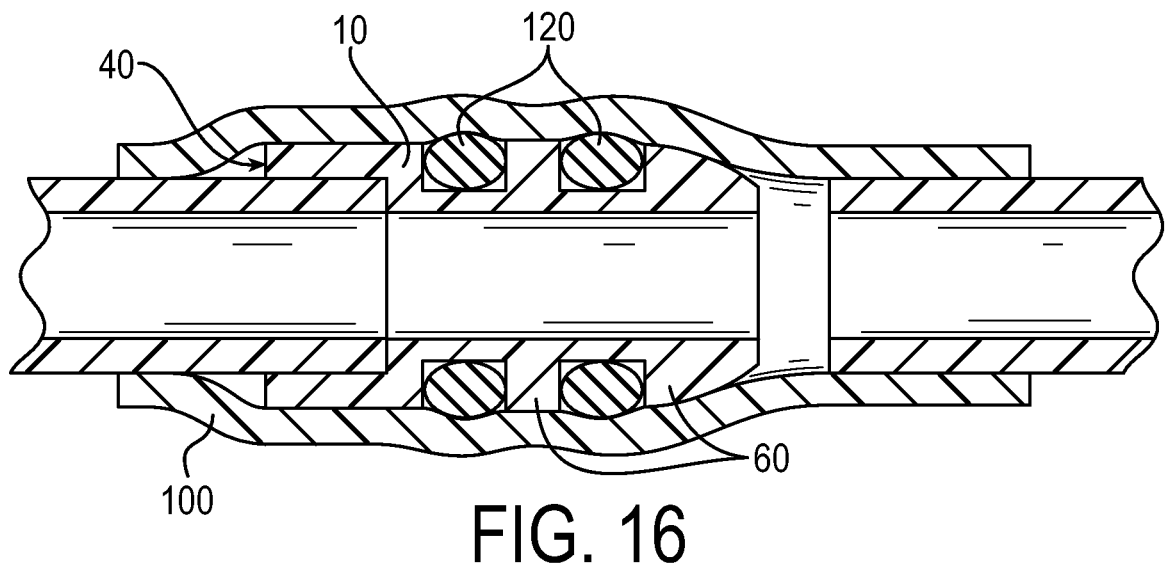
FIG. 16 is a side cross sectional view of a fitting and an overmolded attachment piece having multiple O-rings there between, in accordance with an embodiment of the invention.

In FIG. 16 multiple O-rings 120 are provided at the fitting 10. Barbs 60 may be positioned adjacent to each O-ring 120. As illustrated by FIG. 16, the overmolded attachment piece 100 extends over the fitting 10 and extends beyond the second end 40 of the fitting 10. In this embodiment, the second end 40 of the fitting acts as an additional barb.

Figure 17:
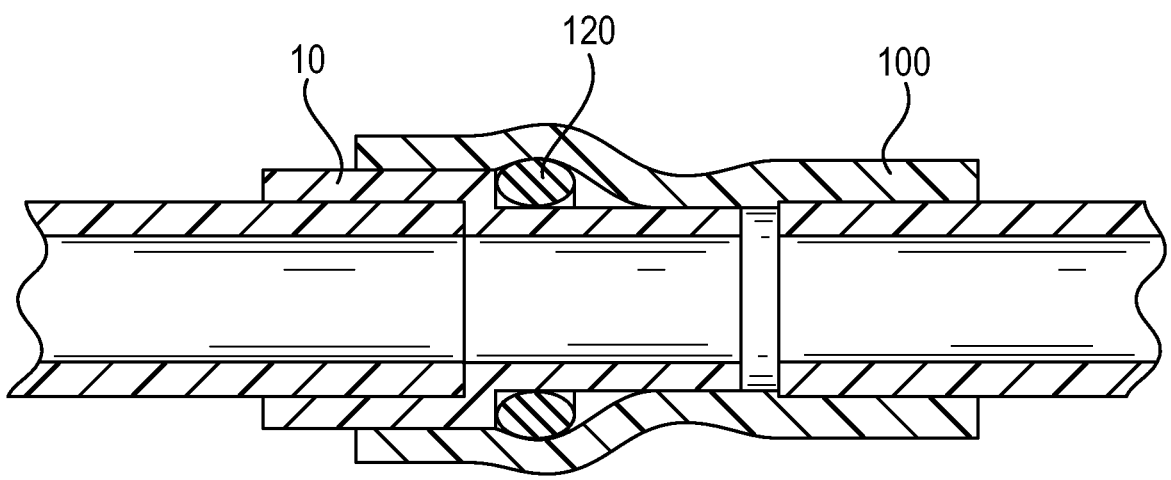
FIG. 17 is a side cross sectional view of a fitting and an overmolded attachment piece having an O-ring, in accordance with an embodiment of the invention.

FIG. 17 illustrates an overmolded attachment piece 100 which has been expanded prior to being extended over a fitting 10. Once the overmolded attachment piece 100 is positioned over the fitting 10, it is reduced or relaxed about the fitting 10. In this embodiment, the overmolded attachment piece 100 is additionally reduced or relaxed about an O-ring 120 positioned about a surface of the fitting 10.

Figure 18:
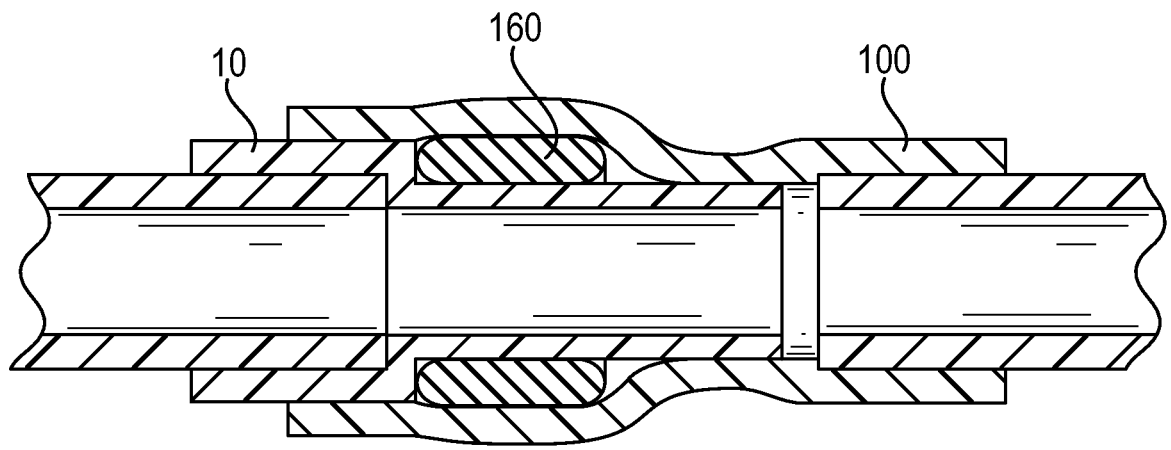
FIG. 18 is a side cross sectional view of a fitting and an overmolded attachment piece having a pliable sleeve there between, in accordance with an embodiment of the invention.

FIG. 18 illustrates a variation of FIG. 17. In this variation, the O-ring 120 is replaced by a pliable sleeve 160. In contrast to an O-ring, the pliable sleeve 160 has a greater surface area which engages the fitting 10 and/or the overmolded attachment piece 100.

Figure 19:
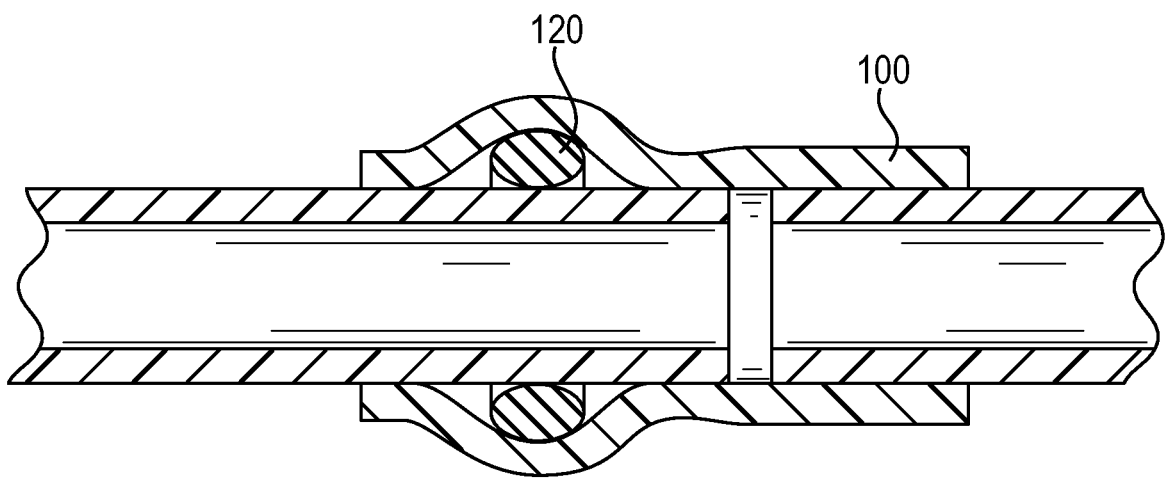
FIG. 19 is a side cross sectional view of a tube and an overmolded attachment piece, in accordance with an embodiment of the invention.

Turning to FIG. 19, an overmolded attachment piece 100 is positioned over a tube with an O-ring 120 there between. A fitting is not provided at the tube end. To place the overmolded attachment piece 100 over the tube, the overmolded attachment piece 100 is expanded to allow it to extend over the tube and the O-ring 120 positioned between the tube and the overmolded attachment piece 100. The overmolded attachment piece 100 is then reduced or relaxed about the tube and the O-ring 120.

Figure 20:
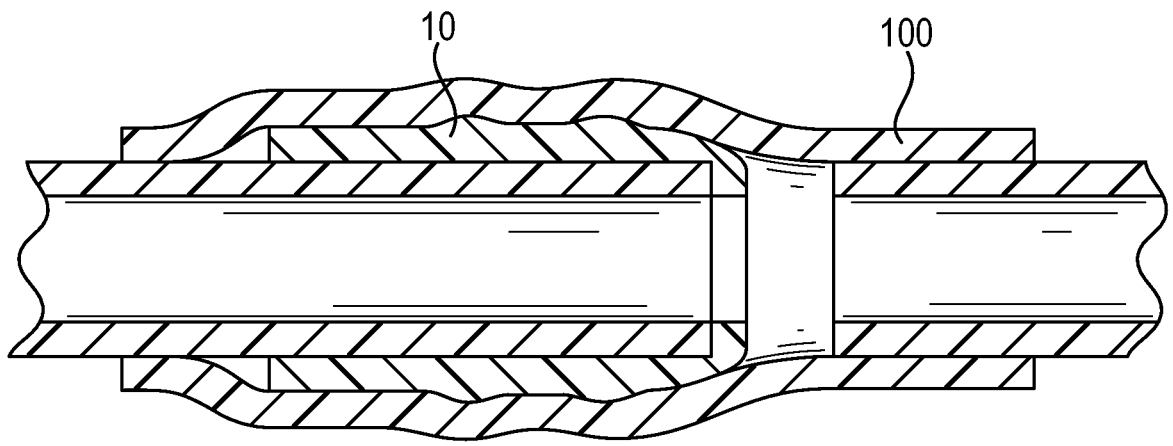
FIG. 20 is a side cross sectional view of a fitting formed of generally pliable material and an overmolded attachment piece, in accordance with an embodiment of the invention.

Turning now to FIG. 20, a fitting 10 is formed of generally pliable material. The generally pliable material compresses and/or distorts under pressure from the overmolded attachment piece 100. This compression and/or distortion of the generally pliable material grips and the overmolded attachment piece thereby forming a seal. The fitting may additionally be formed of an overmolded polymer.

Figure 21:
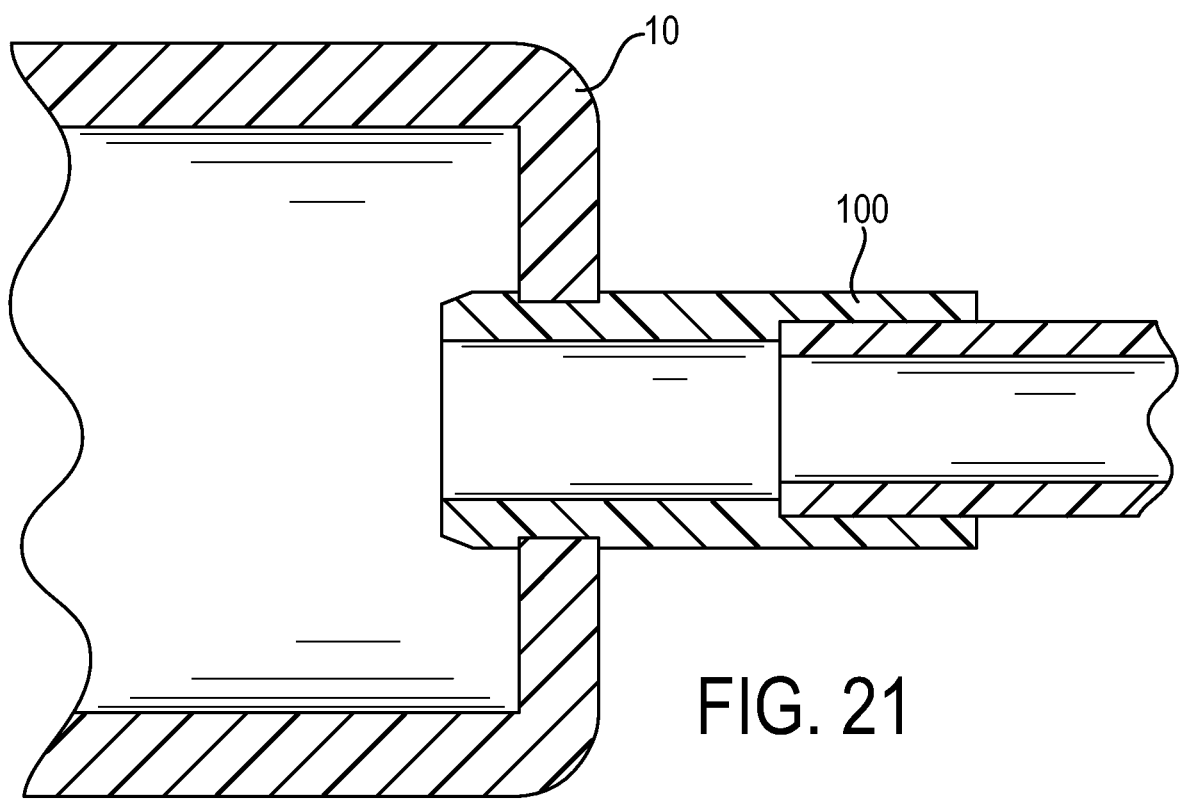
FIG. 21 is a side cross sectional view of an overmolded attachment piece inserted into an opening of a fitting, in accordance with an embodiment of the invention.

FIG. 21 illustrates yet another configuration wherein a fitting 10 extends over an overmolded attachment piece 100. Or, in other words, the overmolded attachment piece 100 is inserted into an opening or hole of the fitting 10. In one embodiment, the overmolded attachment piece 100 is compressed and inserted or pushed into the fitting 10. The overmolded attachment piece 100 is then expanded to make a seal at the fitting 10. In another embodiment, the opening or hole of the fitting 10 is expanded about the overmolded attachment piece 100. The opening or hole of the fitting is then contracted to make a seal at the overmolded attachment piece 100.

Figure 22:
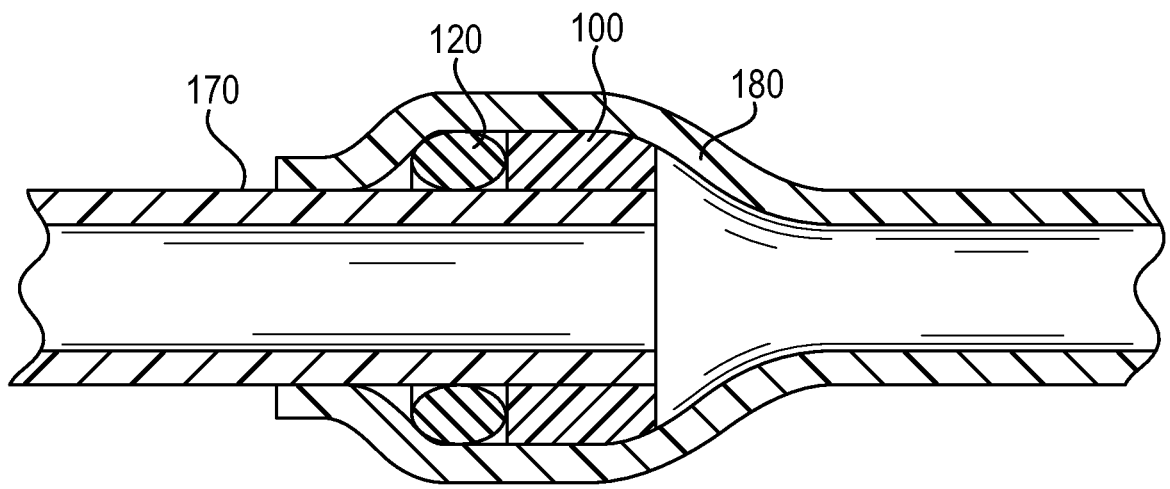
FIG. 22 is a side cross sectional view of an overmolded attachment pieces positioned on a male tube over which a female tube extends, in accordance with an embodiment of the invention.

In FIG. 22 an overmolded attachment piece 100 is provided on a male tube 170 instead of a fitting 10. A female tube 180 is expanded and installed over the overmolded attachment piece 100. An O-ring 120 may also be provided on the male tube 170. In this figure, an overmolded attachment piece is not provided on the female tube, however, it is contemplated an additional overmolded attachment piece may be provided at the tube.

FIG. 23 illustrates another configuration where neither a fitting or an overmolded attachment piece are provided. Specifically, a female tube 180 is expanded and installed over a male tube 170. By expanding the female tube 180, an O-ring 120 is additionally positioned between the female tube 180 and the male tube 170. A seal is thereby formed between the female tube 180 and the male tube 170.

FIGS. 24-25 illustrate an embodiment wherein the tube and/or overmolded attachment piece 100 has an bore inside diameter $110_{ID}$ expanded to a dimension greater than the greatest outside diameter of the fitting 10. In this instance the greatest outside diameter of the fitting 10 is an outside diameter $60_{OD}$ of the barb 60. However, it is appreciated the outside diameter may be of a raised surface, an O-ring 120, or any portion of the fitting. Upon inserting the fitting 10 into the overmolded attachment piece 100, shape memory is applied to the tube and/or overmolded attachment piece 100 causing the tube and/or overmolded attachment piece 100 to compress, or at least the bore inside diameter $110_{ID}$ to compress, about the fitting 10. As illustrated in FIG. 25, this includes compressing the tube and/or overmolded attachment piece to a pre-expanded shape, or at least the bore inside diameter $110_{ID}$, to a pre-expanded shape, thereby creating a seal about any O-rings, barb(s), raised surfaces included on or at the fitting. This fitting of FIGS. 24-25 illustrates a fitting having a barb 60 and an O-ring 120, however, any combination of features at the fitting, the tube, and/or the overmolded attachment piece are contemplated in the present embodiment.

As used in this application, the term "overmold" means the process of injection molding a second polymer over a first polymer, wherein the first and second polymers may or may not be the same. In one embodiment of the invention, the composition of the overmolded polymer will be such that it will be capable of at least some melt fusion with the composition of the polymeric tube. There are several means by which this may be affected. One of the simplest procedures is to insure that at least a component of the polymeric tube and that of the overmolded polymer is the same. Alternatively, it would be possible to insure that at least a portion of the polymer composition of the polymeric tube and that of the overmolded polymer is sufficiently similar or compatible so as to permit the melt fusion or blending or alloying to occur at least in the interfacial region between the exterior of the polymeric tube and the interior region of the overmolded polymer. Another manner in which to stat this would be to indicate that at least a portion of the polymer compositions of the polymeric tube and the overmolded polymer are miscible. In contrast, the chemical composition of the polymers may be relatively incompatible, thereby not resulting in a material-to-material bond after the injection overmolding process.

In one embodiment of this invention, polymeric tubing is made from high density polyethylene which is crosslinked. Additionally, the overmolded attachment piece may be made from high density polyethylene which is crosslinked. PEX contains crosslinked bonds in the polymer structure changing the thermoplastic into a thermoset. Crosslinking may be accomplished during or after the molding of the part. The required degree of crosslinking for crosslinking polyethylene tubing, according to ASTM Standard F 876, is between 65-89%. There are three classifications of PEX, referred to as PEX-A, PEX-B, and PEX-C. PEX-A is made by peroxide (Engel) method. In the PEX-A method, peroxide blending with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during molding and during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. The permanent crosslinked shape is now stored while the sample shows the temporary shape. Heating the shape memory polymer above a transition temperature $T_{trans}$ induces the shape memory effect providing internal forces urging the crosslinked polymer toward its permanent or crosslinked shape. Alternatively or in addition to the application of an external stimulus, it is possible to apply an internal stimulus (e.g., the passage of time) to achieve a similar, if not identical result.

A chemical crosslinked network may be formed by low doses of irradiation. Polyethylene chains are oriented upon the application of mechanical stress above the melting temperature of polyethylene crystallites, which can be in the range between 60° C. and 13° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrocholorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made form stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from polly(2-methyl-2-oxazoline) and a poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

In processing, several steps may be taken to secure the fitting to an extruded polymeric tube. The overmolded attachment piece having a bore may be overmolded on a tube at or adjacent one end of the tube. The first end of the fitting, as disclosed in the various embodiments above, may be inserted into the bore of the overmolded attachment piece. The fitting may be inserted into the overmolded attachment piece entirely, from the first end of the fitting to the second end of the fitting, or alternatively, may be inserted partially into the overmolded attachment piece. Alternatively, the fitting may be inserted directly into the extruded polymeric tube. The overmolded attachment piece or extruded polymeric tube may be secured to the fitting by shape memory. The step of securing may additionally or alternatively include biasing the bore with one or more barbs and/or one or more raised surfaces. In yet another embodiment, the process for securing the fitting to an extruded polymeric tube may include the step of extending or sliding the overmolded attachment piece over an O-ring as described above. The process of sliding may further include sliding the overmolded attachment piece over the O-ring without moving the O-ring from the reduced surface. In one particular embodiment, various combinations of these steps are used to eliminate the effects of creep between the fitting and the overmolded attachment piece by using shape memory.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the invention.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A leak-proof connection fitting comprising: an outermost first end; a second end opposite the outermost first end; a barb proximal the outermost first end having a barb outside diameter at an apex of the barb, the barb including a surface area extending from the outermost first end to the apex of the barb; a raised surface distal the outermost first end and having a surface area, the raised surface being a smooth straight section having a constant raised surface outside diameter; and a reduced surface extending from the apex of the barb to the raised surface, the reduced surface having a reduced surface outside diameter and a surface area, and the reduced surface outside diameter is less than the constant raised surface outside diameter and the barb outside diameter; where the constant raised surface outside diameter is greater than or equal to the barb outside diameter; where the surface area of the raised surface is greater than the surface area of the barb for eliminating the effect of long-term creep when a cuff is positioned over the barb, the reduced surface and the raised surface, where the fitting is monolithic.

2. The leak-proof connection fitting of claim 1 where the surface area of the reduced surface is greater than the surface area of the barb.

3. The leak-proof connection fitting of claim 1 where the reduced surface outside diameter is constant.

4. The leak-proof connection fitting of claim 1 where the reduced surface transitions to the raised surface without any sharp edges.

5. The leak-proof connection fitting of claim 1, the second end further comprising an assembly retraction flange, the assembly retraction flange distal the first outermost end.

6. The leak-proof connection fitting of claim 1 including a sharp edge formed on the barb at the barb outside diameter.

7. The leak-proof connection fitting of claim 1 wherein the leak-proof connection fitting is configured to be inserted into a bore of the cuff having a bore inside diameter less than the raised surface outside diameter.

8. The leak-proof connection fitting of claim 7 wherein the bore inside diameter of the cuff is less than the raised surface outside diameter and the barb outside diameter.

9. The leak-proof connection fitting of claim 7 wherein the bore inside diameter of the cuff is substantially maintained at the reduced surface.

10. The leak-proof connection fitting of claim 1 further comprising an o-ring positioned on the fitting at the reduced surface between the barb and the raised surface.

11. The leak-proof connection fitting of claim 10 where the reduced surface further includes a channel for receiving the o-ring.

12. The leak-proof connection fitting of claim 11 where the channel has a channel outside diameter less than the reduced surface outside diameter.

13. The leak-proof connection fitting of claim 11 where the o-ring is securely positioned within the channel before and after the fitting is inserted in the cuff.

14. The leak-proof connection fitting of claim 10 where the o-ring has an o-ring outside diameter less than the barb outside diameter.

15. A leak-proof connection fitting comprising: an outermost first end; a second end opposite the outermost first end; a barb proximal the outermost first end having a barb outside diameter at an apex of the barb, the barb including a surface area extending from the outermost first end to the apex of the barb; a raised surface distal the outermost first end and having a surface area, the raised surface being a smooth straight section having a constant raised surface outside diameter; and a first reduced surface extending from the apex of the barb to the raised surface, the first reduced surface having a first reduced surface outside diameter and a surface area, and the first reduced surface outside diameter is less than the constant raised surface outside diameter and the barb outside diameter; a second reduced surface extending from the raised surface and away from the first reduced surface, the second reduced surface having a second reduced surface outside diameter and a surface area, and the second reduced surface outside diameter is less than the constant raised surface outside diameter; where the constant raised surface outside diameter is greater than or equal to the barb outside diameter; where the surface area of the raised surface is greater than the surface area of the barb for eliminating the effect of long-term creep when a cuff is positioned over the barb, the reduced surface and the raised surface, where the fitting is monolithic.

* * * * *